US 8,056,082 B2
Nov. 8, 2011

(12) United States Patent
Koretz et al.

(54) CAPACITY MANAGEMENT AND PREDICTIVE PLANNING SYSTEMS BASED ON TRENDED RATE CHANGE OF MONITORED FACTORS AND METHODS THEREOF

(75) Inventors: David A. Koretz, Rochester, NY (US); Jeffrey Lambert, Jr., Rochester, NY (US)

(73) Assignee: BlueTie, Inc., Rochester, NY (US)

( * ) Notice: Subject to any disclaimer, the term of this patent is extended or adjusted under 35 U.S.C. 154(b) by 1264 days.

(21) Appl. No.: 11/443,702

(22) Filed: May 31, 2006

(65) Prior Publication Data

US 2007/0283360 A1    Dec. 6, 2007

(51) Int. Cl.
G06F 9/46 (2006.01)
G06F 15/173 (2006.01)
G06Q 10/00 (2006.01)

(52) U.S. Cl. ........ 718/104; 718/105; 709/223; 709/224; 709/225; 709/226; 705/7.23; 705/7.25

(58) Field of Classification Search .................. 718/104, 718/105; 709/223–226; 702/181, 185–187; 705/10
See application file for complete search history.

(56) References Cited

U.S. PATENT DOCUMENTS

| | | | |
|---|---|---|---|
| 5,101,425 A | 3/1992 | Darland et al. | |
| 5,210,789 A | 5/1993 | Jeffus et al. | |
| 5,442,707 A | 8/1995 | Miyaji et al. | |
| 5,493,105 A | 2/1996 | Desai | |
| 5,509,074 A | 4/1996 | Choudhury et al. | |
| 5,551,030 A | 8/1996 | Linden et al. | |
| 5,615,268 A | 3/1997 | Bisbee et al. | |
| 5,617,114 A | 4/1997 | Bier et al. | |
| 5,640,577 A | 6/1997 | Scharmer | |
| 5,668,995 A * | 9/1997 | Bhat | 718/104 |
| 5,694,563 A | 12/1997 | Belfiore et al. | |
| 5,706,517 A | 1/1998 | Dickinson | |
| 5,727,057 A | 3/1998 | Emery et al. | |
| 5,737,424 A | 4/1998 | Elteto et al. | |
| 5,737,726 A | 4/1998 | Cameron et al. | |
| 5,774,117 A | 6/1998 | Kukkal et al. | |

(Continued)

FOREIGN PATENT DOCUMENTS
WO   WO 00/23862 A3   4/2000

OTHER PUBLICATIONS

Miller, Michael "The Complete Idiot's Guide to Online Auctions," (1999).

(Continued)

*Primary Examiner* — Jennifer To
(74) *Attorney, Agent, or Firm* — LeClairRyan (57) ABSTRACT

A method, computer readable medium and system for capacity management and predictive planning includes monitoring one or more factors related to an overall load on at least one of one or more server systems and trending a rate of change of at least one of the one or more monitored factors. A determination on when to at least one of increase capacity in at least one of the servers systems and add one or more additional server systems is made based on the monitoring and the trending. A notification is output when the determination determines at least one of increasing capacity to at least one of the servers systems and adding one or more additional server systems is needed

30 Claims, 2 Drawing Sheets

U.S. PATENT DOCUMENTS

| | | | | |
|---|---|---|---|---|
| 5,774,668 | A | 6/1998 | Choquier et al. | |
| 5,790,790 | A | 8/1998 | Smith et al. | |
| 5,790,793 | A | 8/1998 | Higley | |
| 5,794,207 | A | 8/1998 | Walker et al. | |
| 5,794,259 | A | 8/1998 | Kikinis | |
| 5,802,518 | A | 9/1998 | Karacy et al. | |
| 5,805,811 | A | 9/1998 | Pratt et al. | |
| 5,818,442 | A | 10/1998 | Adamson | |
| 5,835,896 | A | 11/1998 | Fisher et al. | |
| 5,845,261 | A | 12/1998 | McAbian | |
| 5,845,281 | A | 12/1998 | Benson et al. | |
| 5,848,131 | A | 12/1998 | Moore et al. | |
| 5,848,161 | A | 12/1998 | Luneau et al. | |
| 5,852,807 | A | 12/1998 | Skarbo et al. | |
| 5,855,006 | A | 12/1998 | Huemoeller et al. | |
| 5,870,470 | A | 2/1999 | Johnson et al. | |
| 5,870,544 | A | 2/1999 | Curtis | |
| 5,875,296 | A | 2/1999 | Shi et al. | |
| 5,878,141 | A | 3/1999 | Daly et al. | |
| 5,889,989 | A | 3/1999 | Robertazzi et al. | |
| 5,890,138 | A | 3/1999 | Godin et al. | |
| 5,893,118 | A | 4/1999 | Sonderegger | |
| 5,895,454 | A | 4/1999 | Harrington | |
| 5,897,622 | A | 4/1999 | Blinn et al. | |
| 5,899,980 | A | 5/1999 | Wilf et al. | |
| 5,905,973 | A | 5/1999 | Yonezawa et al. | |
| 5,917,491 | A | 6/1999 | Bauersfeld | |
| 5,940,807 | A | 8/1999 | Purcell | |
| 5,946,665 | A | 8/1999 | Suzuki et al. | |
| 5,948,040 | A | 9/1999 | DeLorme et al. | |
| 5,950,200 | A | 9/1999 | Sudai et al. | |
| 5,956,709 | A | 9/1999 | Xue | |
| 5,960,406 | A | 9/1999 | Rasansky et al. | |
| 5,960,411 | A | 9/1999 | Hartman et al. | |
| 5,963,949 | A | 10/1999 | Gupta et al. | |
| 5,970,475 | A | 10/1999 | Barnes et al. | |
| 5,974,441 | A | 10/1999 | Rogers et al. | |
| 5,987,423 | A | 11/1999 | Arnold et al. | |
| 5,991,740 | A | 11/1999 | Messer | |
| 5,995,098 | A | 11/1999 | Okada et al. | |
| 5,999,914 | A | 12/1999 | Blinn et al. | |
| 5,999,938 | A | 12/1999 | Bliss et al. | |
| 6,006,215 | A | 12/1999 | Retallick | |
| 6,006,332 | A | 12/1999 | Rabne et al. | |
| 6,014,647 | A | 1/2000 | Nizzari et al. | |
| 6,016,478 | A | 1/2000 | Zhang et al. | |
| 6,058,417 | A | 5/2000 | Hess et al. | |
| 6,065,046 | A | 5/2000 | Feinberg et al. | |
| 6,085,166 | A | 7/2000 | Beckharadt et al. | |
| 6,086,618 | A * | 7/2000 | Al-Hilali et al. | 703/2 |
| 6,111,572 | A | 8/2000 | Blair et al. | |
| 6,141,005 | A | 10/2000 | Hetherington et al. | |
| 6,148,335 | A * | 11/2000 | Haggard et al. | 709/224 |
| 6,182,109 | B1 | 1/2001 | Sharma et al. | |
| 6,219,669 | B1 | 4/2001 | Haff et al. | |
| 6,259,405 | B1 | 7/2001 | Stewart et al. | |
| 6,262,725 | B1 | 7/2001 | Hetherington et al. | |
| 6,266,651 | B1 | 7/2001 | Woolston | |
| 6,269,135 | B1 | 7/2001 | Sander | |
| 6,269,369 | B1 | 7/2001 | Robertson | |
| 6,363,392 | B1 | 3/2002 | Halstead et al. | |
| 6,369,840 | B1 | 4/2002 | Barnett et al. | |
| 6,370,566 | B2 | 4/2002 | Discolo et al. | |
| 6,393,421 | B1 | 5/2002 | Paglin | |
| 6,430,611 | B1 * | 8/2002 | Kita et al. | 709/223 |
| 6,446,123 | B1 * | 9/2002 | Ballantine et al. | 709/224 |
| 6,581,088 | B1 | 6/2003 | Jacobs et al. | |
| 6,598,027 | B1 | 7/2003 | Breen et al. | |
| 6,601,092 | B2 | 7/2003 | Itabashi et al. | |
| 6,633,898 | B1 | 10/2003 | Seguchi et al. | |
| 6,647,370 | B1 | 11/2003 | Fu et al. | |
| 6,658,473 | B1 | 12/2003 | Block et al. | |
| 6,732,171 | B2 | 5/2004 | Hayden | |
| 6,763,335 | B1 | 7/2004 | Nanbu et al. | |
| 6,831,970 | B1 | 12/2004 | Awada et al. | |
| 6,862,623 | B1 * | 3/2005 | Odhner et al. | 709/226 |
| 6,879,691 | B1 | 4/2005 | Koretz | |
| 6,898,564 | B1 * | 5/2005 | Odhner et al. | 703/21 |
| 6,917,963 | B1 | 7/2005 | Hipp et al. | |
| 6,938,256 | B2 | 8/2005 | Deng et al. | |
| 6,950,662 | B2 | 9/2005 | Kumar | |
| 6,954,784 | B2 | 10/2005 | Aiken, Jr. et al. | |
| 6,957,433 | B2 | 10/2005 | Umberger et al. | |
| 6,986,076 | B1 | 1/2006 | Smith et al. | |
| 6,990,662 | B2 | 1/2006 | Messer et al. | |
| 6,993,572 | B2 | 1/2006 | Ross, Jr. et al. | |
| 7,050,936 | B2 | 5/2006 | Levy et al. | |
| 7,110,913 | B2 * | 9/2006 | Monroe et al. | 702/179 |
| 7,113,990 | B2 | 9/2006 | Scifres et al. | |
| 7,124,101 | B1 | 10/2006 | Mikurak | |
| 7,219,109 | B1 | 5/2007 | Lapuyade et al. | |
| 7,305,471 | B2 * | 12/2007 | Odhner et al. | 709/226 |
| 7,305,491 | B2 | 12/2007 | Miller et al. | |
| 7,313,620 | B2 * | 12/2007 | Odhner et al. | 709/226 |
| 7,392,314 | B2 | 6/2008 | Betzler et al. | |
| 7,437,449 | B1 * | 10/2008 | Monga et al. | 709/224 |
| 7,443,767 | B2 | 10/2008 | Mohler et al. | |
| 7,499,715 | B2 | 3/2009 | Carro et al. | |
| 7,552,208 | B2 * | 6/2009 | Lubrecht et al. | 709/223 |
| 7,562,140 | B2 * | 7/2009 | Clemm et al. | 709/224 |
| 7,617,303 | B2 * | 11/2009 | Duggirala | 709/223 |
| 7,689,448 | B2 | 3/2010 | Fu et al. | |
| 7,711,855 | B2 | 5/2010 | Thind et al. | |
| 7,725,559 | B2 * | 5/2010 | Landis et al. | 709/215 |
| 2001/0049613 | A1 | 12/2001 | Gramann, III et al. | |
| 2002/0099576 | A1 | 7/2002 | MacDonald et al. | |
| 2002/0147759 | A1 | 10/2002 | Ranganathan | |
| 2002/0152305 | A1 * | 10/2002 | Jackson et al. | 709/224 |
| 2002/0178206 | A1 | 11/2002 | Smith | |
| 2003/0069874 | A1 | 4/2003 | Hertzog et al. | |
| 2003/0115244 | A1 * | 6/2003 | Molloy et al. | 709/105 |
| 2003/0135507 | A1 | 7/2003 | Hind et al. | |
| 2004/0010451 | A1 | 1/2004 | Romano et al. | |
| 2004/0015539 | A1 | 1/2004 | Alegria et al. | |
| 2004/0024894 | A1 | 2/2004 | Osman et al. | |
| 2004/0039626 | A1 | 2/2004 | Voorhees | |
| 2004/0103189 | A1 * | 5/2004 | Cherkasova et al. | 709/224 |
| 2004/0117476 | A1 * | 6/2004 | Steele et al. | 709/224 |
| 2004/0162901 | A1 | 8/2004 | Mangipudi et al. | |
| 2005/0005012 | A1 * | 1/2005 | Odhner et al. | 709/226 |
| 2005/0050138 | A1 | 3/2005 | Creamer et al. | |
| 2005/0080696 | A1 * | 4/2005 | Bagchi et al. | 705/35 |
| 2005/0097204 | A1 | 5/2005 | Horowitz et al. | |
| 2005/0114191 | A1 | 5/2005 | Atkin et al. | |
| 2005/0138170 | A1 * | 6/2005 | Cherkasova et al. | 709/225 |
| 2005/0149417 | A1 | 7/2005 | Crescenzo et al. | |
| 2005/0228879 | A1 * | 10/2005 | Cherkasova et al. | 709/224 |
| 2005/0240466 | A1 * | 10/2005 | Duggirala | 705/10 |
| 2005/0278439 | A1 * | 12/2005 | Cherkasova | 709/223 |
| 2005/0278453 | A1 * | 12/2005 | Cherkasova | 709/231 |
| 2006/0020691 | A1 | 1/2006 | Patterson et al. | |
| 2006/0068812 | A1 | 3/2006 | Carro et al. | |
| 2006/0218278 | A1 * | 9/2006 | Uyama et al. | 709/226 |
| 2007/0061441 | A1 * | 3/2007 | Landis et al. | 709/224 |
| 2007/0067435 | A1 * | 3/2007 | Landis et al. | 709/224 |
| 2007/0067440 | A1 | 3/2007 | Bhogal et al. | |
| 2007/0113186 | A1 * | 5/2007 | Coles et al. | 715/735 |
| 2007/0130364 | A1 | 6/2007 | Joglekar et al. | |
| 2007/0168498 | A1 * | 7/2007 | Lambert et al. | 709/224 |
| 2007/0214188 | A1 | 9/2007 | Lapuyade et al. | |
| 2007/0233556 | A1 | 10/2007 | Koningstein | |
| 2007/0294387 | A1 | 12/2007 | Martin | |
| 2008/0004748 | A1 * | 1/2008 | Butler et al. | 700/244 |
| 2008/0091726 | A1 | 4/2008 | Koretz et al. | |
| 2008/0201720 | A1 | 8/2008 | Betzler et al. | |

OTHER PUBLICATIONS

BuyTextiles.com (http://www.ecompartners.com/buytextiles/htm/listing_help.htm), 1-4 (1999).

David Koretz.com (http://dkoretz.typepad.com/rants/2006/06/featuretisement.html), 1-3 (2006).

"Business Requirements User Load Balancer (ULB)," Blue Tie, Inc., 2006, pp. 1-15.

* cited by examiner

CAPACITY MANAGEMENT AND PREDICTIVE PLANNING SYSTEMS BASED ON TRENDED RATE CHANGE OF MONITORED FACTORS AND METHODS THEREOF

FIELD OF THE INVENTION

This invention generally relates to management of networked computer systems and, more particularly, to capacity management and predictive planning systems for a networked computer system and methods thereof.

BACKGROUND

In the traditional client-server model, the majority of processing and data storage occurs at the client. In the emerging Software as a Service ("SaaS") market, the majority of the processing occurs at the server and the data is centralized to take advantage of the connectivity the Internet provides. The power of the connectivity and information sharing is leading to massively scalable applications that support hundreds of thousands, up to hundreds of millions of users.

Massively scalable applications are creating many new challenges in managing user loads and storage systems in an automated fashion. One of theses challenges is the ability to accurately predict when capacity will be needed in data-heavy applications, such as email, file storage, and online back-up, and also in non-data heavy applications. Making this prediction is difficult because the limitations which can affect available overall load take many forms, including utilization of processor, memory, I/O load (comprising reads per second, writes per second, total transactions per second, and number of ports being utilized), network space, disk space, an application or applications, and power, and these forms are continually changing. Additionally, making this prediction is difficult because it is hard for an administrator to distinguish between a short-term load that can be reached due to a burst of activity and long-term growth that requires increased capacity. Administrators also do not have useful numbers on the different types of utilization of the server systems. As a result, administrators are often in a reactive mode when trying to address capacity concerns. Further, administrators do not have any methods for accurately assessing costs, such as the cost per user per service especially when multiple servers are required for a single service or for assessing whether to maximize the configuration of a server or purchase a new server to add capacity.

SUMMARY

A method for capacity management and predictive planning in accordance with embodiments of the present invention includes monitoring one or more factors related to an overall load on at least one of one or more server systems and trending a rate of change of at least one of the one or more monitored factors. A determination on when to at least one of: increase capacity in at least one of the servers systems; and add one or more additional server systems is made based on the monitoring and the trending. At least one of a notification of at least one of the need to increase capacity and the need to add one or more additional server systems is output and an implementation of at least one of an increase in capacity in at least one of the server systems and the addition of one or more additional server systems is started when the determination determines at least one of: increasing capacity in at least one of the servers systems; and adding one or more additional server systems is needed.

A computer readable medium having stored thereon instructions for capacity management and predictive planning in accordance with other embodiments of the present invention includes monitoring one or more factors related to an overall load on at least one of one or more server systems and trending a rate of change of at least one of the one or more monitored factors. A determination on when to at least one of: increase capacity in at least one of the servers systems; and add one or more additional server systems is made based on the monitoring and the trending. At least one of a notification of at least one of the need to increase capacity and the need to add one or more additional server systems is output and an implementation of at least one of an increase in capacity in at least one of the server systems and the addition of one or more additional server systems is started when the determination determines at least one of: increasing capacity in at least one of the servers systems; and adding one or more additional server systems is needed.

A system for capacity management and predictive planning in accordance with other embodiments of the present invention includes a monitoring system, a trending system, a planning system, and at least one of a notification system and an initiation system. The monitoring system monitors one or more factors related to an overall load on at least one of one or more server systems. The trending system trends a rate of change of at least one of the one or more monitored factors. The planning system determines when at least one of: increasing capacity in at least one of the servers systems; and adding one or more additional server systems are needed based on the monitoring and the trending. At least one of the notification system that outputs a notification of at least one of the need to increase capacity and the need to add one or more additional server systems and the initiation system that at least one of starts an implementation of an increase in capacity in at least one of the server systems and an addition of one or more additional server systems when the planning system determines at least one of: increasing capacity to at least one of the servers systems; and adding one or more additional server systems is needed.

The present invention provides a number of advantages including providing an effective and automated system and method for managing and predicting when increased capacity will be required. With the present invention, growth of existing user loads with each server system is taken into account when managing and predicting future capacity because as the usage of each user load grows fewer user loads can be stored per server system and capacity management and planning must be adjusted. Additionally, the administrator is provided with information on the numbers for the utilization of the different types of server systems.

The present invention also provides advance notification to an administrator when more capacity is needed and allows the administrator to set how far ahead in advance he/she needs to be notified. This provides the administrator with more system management options, such as trying to bundle purchases together for greater purchasing leverage or scheduling large updates to the infrastructure on a periodic basis instead of constant small additions.

Further, the present invention takes into account variances in hardware configuration of each of the server systems and allows the administrator to enter those configurations. These entered configurations provide for more accurate and effective capacity management and planning by taking into account factors, such as increased capacity that newer server systems may provide.

Even further, the present invention allows the administrator to enter in cost information and then determines and provides the cost data, such as the cost to add capacity to existing server systems versus the cost to add new server systems or the cost per user per service, which can be used for more cost effective, capacity management and planning. The present invention also enables administrators to view the cost of complex services with more than one server involved, such as database servers, mail servers, file servers, and application servers. This allows administrators to improve the efficiency of their purchasing and to more accurately understand the true costs of the services they are managing that utilize multiple servers.

DETAILED DESCRIPTION

Figure 1:
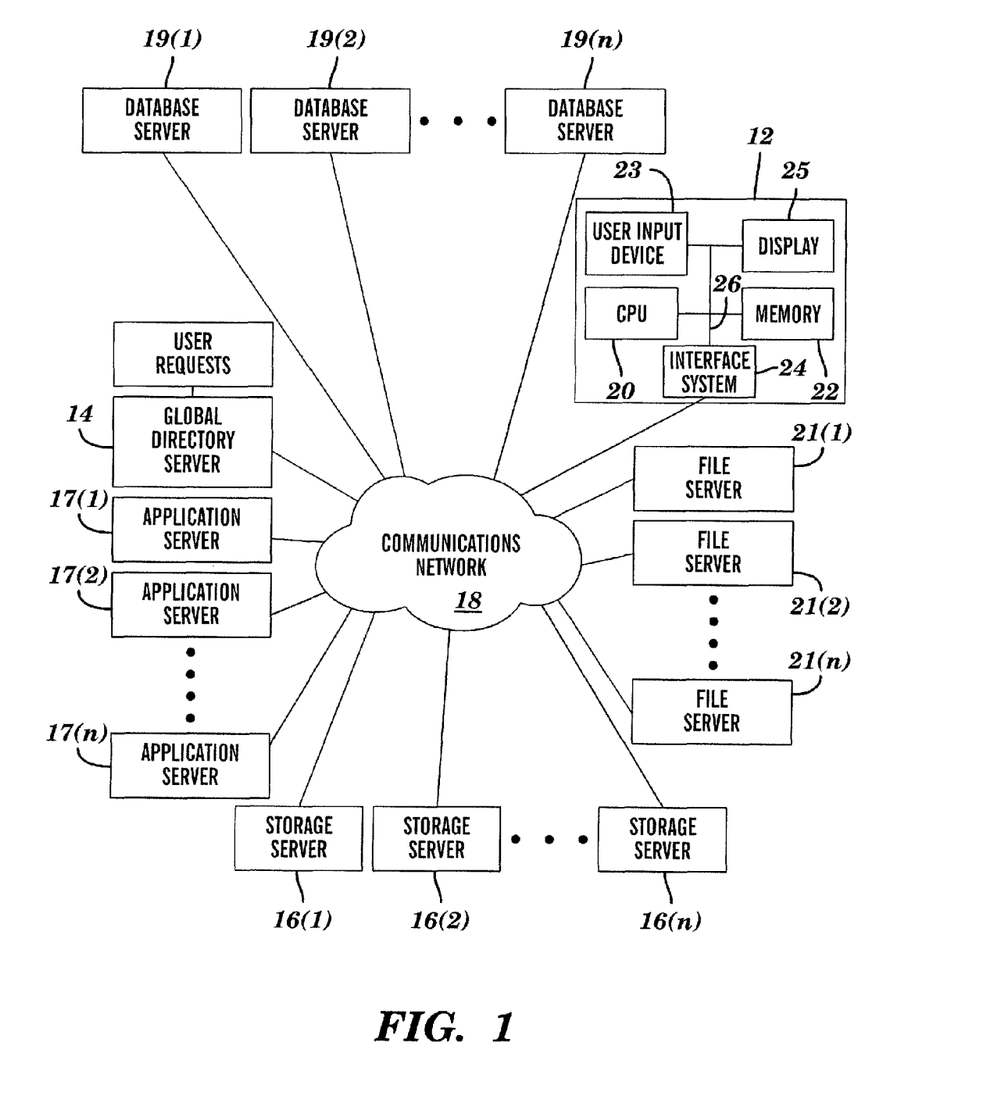
FIG. 1 is a block diagram of a networked computer system with a capacity management and predictive planning system in accordance with embodiments of the present invention.

A system 10 with a capacity management and predictive planning system 12 in accordance with other embodiments of the present invention is illustrated in FIG. 1. The system 10 includes the planning system 12, a global directory server 14, storage server systems 16(1)-16(n), application server systems 17(1)-17(n), database server systems 19(1)-19(n), and file server systems 21(1)-21(n) and a communications network 18, although the management system 10 can comprise other numbers and types of server systems, systems, devices, equipment, and/or components in other configurations. The present invention provides a number of advantages including providing an effective and automated system and method for managing and predicting when additional capacity will be required along with providing associated costs for the upgrade.

Referring more specifically to FIG. 1, the planning system 12 predicts when and if capacity needs to and can be increased in the storage server systems 16(1)-16(n), application server systems 17(1)-17(n), database server systems 19(1)-19(n), and file server systems 21(1)-21(n) and/or when one or more additional server systems need to be added, although the planning system can be used to manage and predict capacity needs for other types of systems and equipment, such as switches, load balancers, routers, and firewalls. Additionally, the planning system 12 tracks and stores utilization by each user of each service and use of each of the storage server systems 16(1)-16(n), application server systems 17(1)-17(n), database server systems 19(1)-19(n), and/or file server systems 21(1)-21(n). Further, the planning system 12 determines and provides cost data, such as the cost to add capacity to existing server systems versus the cost to add new server systems or the cost per user or the cost per user per service, although the planning system 12 can perform other types and numbers of functions and provide other types of cost data and outputs and can be embodied in other numbers of systems.

In these particular embodiments, the planning system 12 comprises a central processing unit (CPU) or processor 20, a memory 22, user input device 23, an interface system 24, and a display 25 which are coupled together by a bus or other link 26, although the planning system 12 can comprise other numbers and types of components and systems in other configurations. The processor 20 executes a program of stored instructions for one or more aspects of the present invention as described and illustrated herein, including the method for capacity management and predictive planning, although the processor 20 could execute other types of programmed instructions.

The memory 22 stores these programmed instructions for one or more aspects of the present invention as described herein, including the method for capacity management and predictive planning, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to one of the processor, can be used for the memory 22.

The user input device 23 is used to input selections, such as time periods for advanced notification of additional capacity requirements, cost of servers and other components and systems, configuration data, and directory information, although other types of data could be input. The user input device 23 comprises a computer keyboard and a computer mouse, although other types and numbers of user input devices 23 can be used.

The interface system 24 is used to operatively couple and communicate between the planning system 12 and the global directory serve 14, the storage server systems 16(1)-16(n), application server systems 17(1)-17(n), database server systems 19(1)-19(n), and file server systems 21(1)-21(n) and via communications system 18, although other types and numbers of connections and other configurations could be used. In this particular embodiment, the communication system 18 is via TCP/IP over Ethernet and uses industry-standard protocols including SOAP, XML, LDAP, and SNMP, although other types and numbers of communication systems, such as a direct connection, a local area network, a wide area network, modems and phone lines, e-mails, and/or wireless communication technology each having their own communications protocols, could be used.

The display 25 is used to show data and information to the administrator, such as an advanced notification of capacity requirements, recommendations for increasing capacity in existing server systems and/or adding new server systems and cost data per user per service, although other types of data and information could be displayed and other manners of providing notification can be used, such as via email, page, SMS, and Web. The display 25 comprises a computer display screen, such as a CRT or LCD screen by way of example only, although other types and numbers of displays could be used.

The global directory server 14 includes a centralized master directory where storage server systems 16(1)-16(n), application server systems 17(1)-17(n), database server systems 19(1)-19(n), and file server systems 21(1)-21(n), services, user data, and other data are located, although the global directory server 14 can store other types of information. Any user via a service or application can query or request the global directory server 14 to find out where a server system, service, user data or other data is located, although other types of location information can be retrieved.

The global directory server 14 also includes a central processing unit (CPU) or processor, a memory, and an interface system which are coupled together by a bus or other link, although other numbers and types of components and systems in other configurations. For example, the global directory server 14 can comprise a single server as shown, can be replicated in a series of masters and slaves, or can comprise a replication tier. In a master/slave environment, the master global directory server will be in charge of all updates and the slave global directory servers will be read servers that respond to application requests. This configuration would enable the directory in the global directory server 14 to scale.

In this particular embodiment, the processor in the global directory server 14 shown in FIG. 1 executes a program of stored instructions for one or more aspects of the present invention as described herein, including maintaining a list of all of the active storage server systems 16(1)-16(n), application server systems 17(1)-17(n), database server systems 19(1)-19(n), and file server systems 21(1)-21(n) and a directory where the location of storage server systems 16(1)-16(n), application server systems 17(1)-17(n), database server systems 19(1)-19(n), and file server systems 21(1)-21(n), services, user data, and other data is located. Each time a new server system is added to the storage server systems 16(1)-16(n), the application server systems 17(1)-17(n), database server systems 19(1)-19(n), and file server systems 21(1)-21(n), it is added to the list in the global directory server 14 and then is accessible to provision user loads against. In these particular embodiments, a user load comprises a load on a given server or servers 16(1)-16(n), 17(1)-17(n), 19(1)-19(n), and/or 21(1)-21(n) using one or more services, such as storage or an application. The memory in the global directory server 14 stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor, can be used for the memory in the global directory server system 14. The interface system in the global directory server 14 is used to operatively couple and communicate between the global directory server 14 and the planning system 12, the storage server systems 16(1)-16(n), the application server systems 17(1)-17(n), database server systems 19(1)-19(n), and file server systems 21(1)-21(n), although other types of connections and other types and combinations of systems could be used.

Each of the storage server systems 16(1)-16(n) has one or more user loads comprising data, such as email or other files, although one or more of the storage server systems 16(1)-16(n) could have other functions and other types and numbers of systems could be used in place of one or more of the storage server systems 16(1)-16(n), such as network area storage. Each of the storage server systems 16(1)-16(n) also includes a central processing unit (CPU) or processor, a memory, and an interface system which are coupled together by a bus or other link, although other numbers and types of each of the components and other configurations and locations for the components can be used.

The processor in each of the storage server systems 16(1)-16(n) executes a program of stored instructions for one or more aspects of the present invention as described herein, including storing data and processing requests related to one or more user loads. The memory stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in the management server system. The interface system in each of the storage server systems 16(1)-16(n) is used to operatively couple and communicate between the storage server systems 16(1)-16(n) and the planning system 12, the global directory server system 14, the application server systems 17(1)-17(n), database server systems 19(1)-19(n), and file server systems 21(1)-21(n), although other types of connections and other types and combinations of systems could be used.

Each of the application server systems 17(1)-17(n) has one or more user loads relating to the execution of one or more applications, such as email, online back-up, and collaboration by way of example only, although one or more of the application server systems 17(1)-17(n) could have other functions and other types and numbers of systems could be used. Each of the application server systems 17(1)-17(n) also includes a central processing unit (CPU) or processor, a memory, and an interface system which are coupled together by a bus or other link, although other numbers and types of each of the components and other configurations and locations for the components can be used.

The processor in each of the application server systems 17(1)-17(n) executes a program of stored instructions for one or more aspects of the present invention as described herein, including executing applications, such as email, online back-up, and collaboration by way of example only. The memory stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor, can be used for the memory in the management server system. The interface system in each of the application server systems 17(1)-17(n) is used to operatively couple and communicate between the application server systems 17(1)-17(n) and the planning system 12, the global directory server system 14, the storage server systems 16(1)-16(n), the database server systems 19(1)-19(n), and the file server system 21(1)-21(n), although other types of connections and other types and combinations of systems could be used.

Each of the database server systems 19(1)-19(n) manage one or more databases, although one or more of the database server systems 19(1)-19(n) could have other functions and other types and numbers of systems could be used in place of one or more of the database server systems 19(1)-19(n). Each of the database server systems 19(1)-19(n) also includes a central processing unit (CPU) or processor, a memory, and an interface system which are coupled together by a bus or other link, although other numbers and types of each of the components and other configurations and locations for the components can be used.

The processor in each of the database server systems 19(1)-19(n) executes a program of stored instructions for one or more aspects of the present invention as described herein, including managing access to one or more databases. The memory stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in the management server system. The interface system in each of the database server systems 19(1)-19(n) is used to operatively couple and communicate between the database server systems 19(1)-19(n) and the planning system 12, the global directory server system 14, the storage server systems 16(1)-16(n), the application server systems 17(1)-17(n), and the file server systems 21(1)-21(n), although other types of connections and other types and combinations of systems could be used.

Each of the file server systems 21(1)-21(n) can be used to store information, such as email, financial data, or back-up files, although one or more of the file server systems 21(1)-21(n) could have other functions and other types and numbers of systems could be used in place of one or more of the file server systems 21(1)-21(n). Each of the file server systems 21(1)-21(n) also includes a central processing unit (CPU) or processor, a memory, and an interface system which are coupled together by a bus or other link, although other numbers and types of each of the components and other configurations and locations for the components can be used.

The processor in each of the file server systems 21(1)-21(n) executes a program of stored instructions for one or more aspects of the present invention as described herein, including storing data and processing requests related to one or more user loads. The memory stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in the management server system. The interface system in each of the file server systems 21(1)-21(n) is used to operatively couple and communicate between file server systems 21(1)-21(n) and the planning system 12, the global directory server system 14, the storage server systems 16(1)-16(n), the application server systems 17(1)-17(n), and the database server systems 19(1)-19(n), although other types of connections and other types and combinations of systems could be used.

Although an example of embodiments of the planning system 12, the global directory server system 14, the storage server systems 16(1)-16(n), the application server systems 17(1)-17(n), the database server systems 19(1)-19(n), and file server systems 21(1)-21(n) is described and illustrated herein, each of the planning system 12, the global directory server system 14, the storage server systems 16(1)-16(n), database server systems 19(1)-19(n), and file server systems 21(1)-21(n) of the present invention could be implemented on any suitable computer system or computing device. It is to be understood that the devices and systems of the exemplary embodiments are for exemplary purposes, as many variations of the specific hardware and software used to implement the exemplary embodiments are possible, as will be appreciated by those skilled in the relevant art(s).

Furthermore, each of the systems of the present invention may be conveniently implemented using one or more general purpose computer systems, microprocessors, digital signal processors, micro-controllers, and the like, programmed according to the teachings of the present invention as described and illustrated herein, as will be appreciated by those skilled in the computer and software arts.

In addition, two or more computing systems or devices can be substituted for any one of the systems in any embodiment of the present invention. Accordingly, principles and advantages of distributed processing, such as redundancy, replication, and the like, also can be implemented, as desired, to increase the robustness and performance the devices and systems of the exemplary embodiments. The present invention may also be implemented on computer system or systems that extend across any network using any suitable interface mechanisms and communications technologies including, for example telecommunications in any suitable form (e.g., voice, modem, and the like), wireless communications media, wireless communications networks, cellular communications networks, G3 communications networks, Public Switched Telephone Network (PSTNs), Packet Data Networks (PDNs), the Internet, intranets, a combination thereof, and the like.

The present invention may also be embodied as a computer readable medium having instructions stored thereon for predictive capacity planning as described herein, which when executed by a processor, cause the processor to carry out the steps necessary to implement the methods of the present invention as described and illustrated herein.

Figure 2:
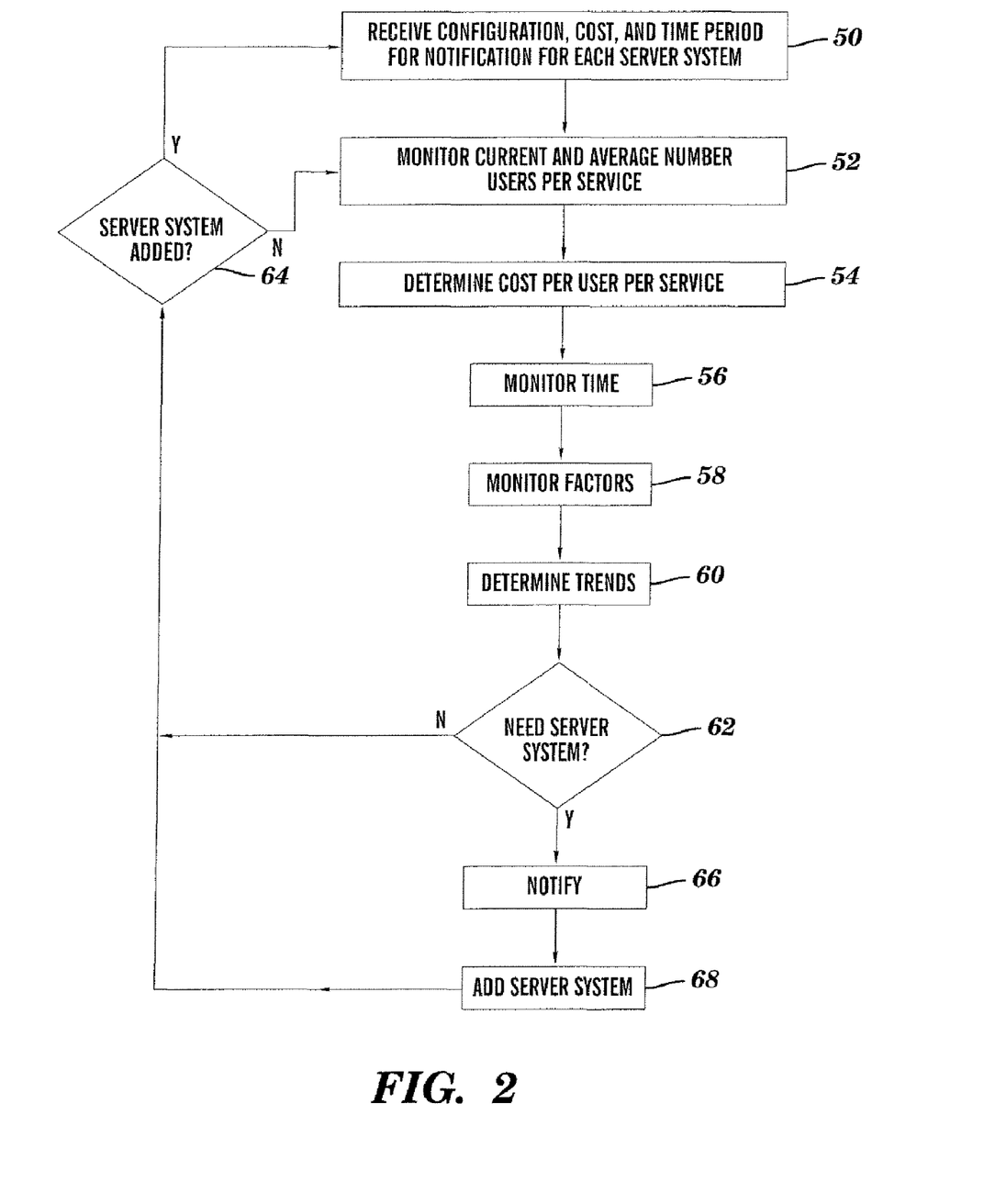
FIG. 2 is a flow chart of a method for capacity management and predictive planning in accordance with embodiments of the present invention.

The operation of the system 10 with the planning system 12 in accordance with embodiments of the present invention will now be described with reference to FIGS. 1-2. In step 50, an administrator or other operator using the user input device 23 enters configuration data, cost data, advanced notification time periods, available services, such as online back-up and email, and lifespan data for each of the storage server systems 16(1)-16(n), application server systems 17(1)-17(n), database server systems 19(1)-19(n), and file server systems 21(1)-21(n) into the planning system 12, although other types and amounts of data can be entered and received by the planning system 12. Additionally, other manners for entering this data could be used, such as with an application program user interface or an import utility which are configured to automatically download and input this data into the planning system 12.

More specifically, the configuration data which is entered for each of the storage server systems 16(1)-16(n), application server systems 17(1)-17(n), database server systems 19(1)-19(n), and file server systems 21(1)-21(n) includes the capacity for user loads and the available services in each of the storage server systems 16(1)-16(n), application server systems 17(1)-17(n), database server systems 19(1)-19(n), and file server systems 21(1)-21(n) along with one or more thresholds for one or more monitored factors, although other types and amounts of configuration data could be entered or retrieved from other sources, such as memory 22, and for other systems, devices, and equipment.

In these particular embodiments, the thresholds used by the planning system 12 include: processor load greater than 90% average for more than 180 minutes; RAM utilization at greater than 90% average for more than 300 minutes; disk space utilization higher than 95%; I/O load comprising at least one of I/O reads per second, writes per second, total transactions per second, and port utilization in excess of 85% of capacity for more than 120 minutes; and network load in excess of 66%, although other numbers and types of thresholds could be entered or retrieved in the planning system 12 and these are for exemplary purposes only.

The cost data which is entered for each of the storage server systems 16(1)-16(n), application server systems 17(1)-17(n), database server systems 19(1)-19(n), and file server systems 21(1)-21(n) includes the cost of purchasing and the annual operating cost for each of the storage server systems 16(1)-16(n), application server systems 17(1)-17(n), database server systems 19(1)-19(n), and file server systems 21(1)-21(n) although other types and amounts of cost data can be entered or retrieved in the planning system 12. Additionally, the cost data which is entered includes the cost for upgrading components and increasing capacity in one or more of the server systems 16(1)-16(n), 17(1)-17(n), 19(1)-19(n), and 21(1)-21(n). With this cost data, the planning system 12 is able to not only provide notification of the need for additional capacity, but also the real-time cost of increasing capacity in one or more of the existing storage server systems 16(1)-16(n), application server systems 17(1)-17(n), database server systems 19(1)-19(n), and/or file server systems 21(1)-21(n) and/or the cost to add one or more new server systems as well as other cost data, such as the cost per user per service based on the tracked utilization. With this cost information, the administrator is able to quickly identify the most cost effective solution to existing and future capacity needs and also knows the actual cost per user per service so that the costs can be recouped.

The advance notification time period data which is entered for each of the storage server systems 16(1)-16(n), application server systems 17(1)-17(n), database server system 19(1)-19(n), and file server systems 21(1)-21(n) comprises the number of days in advance of at least one of the thresholds for one of the factors being exceeded that notification should be provided, although other types of time periods can be entered in and other numbers and types of systems, devices, and/or equipment can be managed by the planning system 12. For example, the planning system 12 can be set up to provide an administrator notice "X" days before additional capacity is required to be added in one or more of the storage server systems 16(1)-16(n), application server systems 17(1)-17(n), database server systems 19(1)-19(n), and file server systems 21(1)-21(n) and/or one or more new additional server systems need to be added, although other time periods can be entered. As described herein, this advance notification is possible through the trending of one or more factors by the planning system 12. As a result, the present invention provides a proactive planning system 12 which helps to avoid system slow downs or crashes because of capacity issues.

The estimated lifespan data which is entered in for each of the storage server systems 16(1)-16(n), application server systems 17(1)-17(n), database server systems 19(1)-19(n), and file server systems 21(1)-21(n) provides an estimate of when it is recommended to replace each of the storage server systems 16(1)-16(n), application server systems 17(1)-17(n), database server systems 19(1)-19(n), and file server systems 21(1)-21(n) and is used in other determinations, such as calculation of the cost per user per month. With the estimated lifespan data, the planning system 12 has an additional parameter to consider when making determinations on whether to add capacity to an existing server system or to purchase a new server system. For example, although a capacity issue may be solved in the short term by increasing capacity in an existing server system. If the lifespan of that server system is about to expire, then the planning system 12 can recommend adding one or more new server systems to solve the capacity issue, rather than to increase existing capacity in an expiring server system.

In step 52, the planning system 12 monitors the number of current users and the services being used on each of the storage server systems 16(1)-16(n), application server systems 17(1)-17(n), database server systems 19(1)-19(n), and file server systems 21(1)-21(n) over time to determine an average number of users per service, although the planning system 12 can monitor and track other types of activity on each of the storage server systems 16(1)-16(n), application server systems 17(1)-17(n), database server systems 19(1)-19(n), and/or file server systems 21(1)-21(n) in other manners.

In step 54, the planning system 12 determines the cost per user per service on each of the storage server systems 16(1)-16(n), application server systems 17(1)-17(n), database server systems 19(1)-19(n), and file server systems 21(1)-21(n) based on the entered cost data and the monitored number of users and services being used, although the planning system 12 can provide other types of analyses. With the cost data, the planning system 12 can display a real-time and long-term trending cost per user for each service on the display 25 which can be helpful when planning in advance for the need for increasing capacity in storage server systems 16(1)-16(n), application server systems 17(1)-17(n), database server systems 19(1)-19(n), and file server systems 21(1)-21(n) and/or for adding new server systems.

In step 56, the planning system 12 monitors real-time and also the advanced notification time periods which have been entered, although the planning system 12 can monitor other types of time related data. Based on the monitored time and the advanced notification time periods, the planning system 12 can determine when to provide the notification to increase capacity in storage server systems 16(1)-16(n), application server systems 17(1)-17(n), database server systems 19(1)-19(n), and/or file server systems 21(1)-21(n) and/or to add one or more new server systems.

In step 58, the planning system 12 monitors or tracks a variety of factors related to the overall load and the user loads on each of the storage server systems 16(1)-16(n), application server systems 17(1)-17(n), database server systems 19(1)-19(n), and file server systems 21(1)-21(n) which are used to determine when to add capacity to one or more of the storage server systems 16(1)-16(n), application server systems 17(1)-17(n), database server systems 19(1)-19(n), and/or file server systems 21(1)-21(n) and/or to add one or more new server systems, although the planning system 12 can monitor other factors.

In these particular embodiments, the planning system 12 includes system monitoring tools, which are well known to those of ordinary skill in the art, and are used to monitor or track: processor utilization (measured in percentages of 100%); disk space utilization (measured in both total Gigabytes (GB) of usable storage as well as measured in a percentage of 100%); RAM utilization (measured in percentages of 100%); I/O load (measured by the number of I/O reads per second, the number of I/O writes per second, and the number of transactions per second), port utilization in this example; and network load (measured as a percentage of 100%) in the storage server systems 16(1)-16(n), although again other types of variables which are measured in other manners can be monitored.

In step 60, the planning system 12 uses the monitored data on the factors, including processor utilization, disk space utilization, RAM utilization, I/O load, and network load, over time along with an estimated total number of users and the one or more services utilized on each of the storage server systems 16(1)-16(n), application server systems 17(1)-17(n), database server systems 19(1)-19(n), and file server systems 21(1)-21(n) to determine usage trends, such as for storage or applications, over time, although other types and numbers of factors in other combinations can be used for this analysis. This trending is used by the planning system 12 to anticipate in advance when additional capacity in storage server systems 16(1)-16(n), application server systems 17(1)-17(n), database server systems 19(1)-19(n), and/or file server systems 21(1)-21(n) and/or one or more new additional server systems are needed. For example, trends for growth of user loads, such as for storage of email files, can be determined so that advanced notification of when additional capacity for email storage will be required can be provided before a shortfall in storage space occurs.

In step 62, the planning system 12 determines if capacity needs to be and can be increased in the one or more storage server systems 16(1)-16(n), application server systems 17(1)-17(n), database server systems 19(1)-19(n), and/or file server systems 21(1)-21(n) and/or if one or more new additional storage server systems and/or additional application server systems need to be added based on the monitored one or more factors and the determined trends over real-time, although other types and numbers of variables can be used by the planning system 12 and included in this determination, such as the determined cost data.

More specifically, in these embodiments the planning system 12 determines if the trending of the monitored processor utilization, disk space utilization, RAM utilization, I/O load, or network load indicates one of the stored thresholds for these factors will be exceeded within the entered advance notification time period, although other manners for indicating an additional server system is needed can be used. For example, the planning system 12 may require the trending to show two or more of the thresholds to be exceeded within the entered advance notification time period before indicating increased capacity in an existing one or more of the storage server systems 16(1)-16(n), application server systems 17(1)-17(n), database server systems 19(1)-19(n), and/or file server systems 21(1)-21(n) and/or one or more new additional storage server systems and/or application server systems is/are needed. The planning system 12 also can be set up with one or more thresholds which can be used to distinguish between short-term spikes in performance which do not necessitate adjustments to increase capacity and/or to add a new server system and long-term growth trends which require notification to the administrator to increase capacity and/or to add an additional server system.

Accordingly, if in step 62 the planning system 12 determines that an increase in capacity in one or more storage server systems 16(1)-16(n), application server systems 17(1)-17(n), database server systems 19(1)-19(n), and/or file server systems 21(1)-21(n) and/or that adding one or more new additional server systems is not needed, then the No branch is taken to step 64. In step 64, the planning system 12 determines if increased capacity in one or more of the storage server systems 16(1)-16(n), application server systems 17(1)-17(n), database server systems 19(1)-19(n), and/or file server systems 21(1)-21(n) and/or one or more new additional storage server systems and or application server systems has been added to the system 10. If additional capacity to one or more storage server systems 16(1)-16(n), application server systems 17(1)-17(n), database server systems 19(1)-19(n), and/or file server systems 21(1)-21(n) and/or one or more new additional storage server systems and or application server systems has not been added, then the No branch is taken back to step 52.

If in step 62 the planning system 12 determines additional capacity to one or more storage server systems 16(1)-16(n), application server systems 17(1)-17(n), database server systems 19(1)-19(n), and/or file server systems 21(1)-21(n) and/ or one or more new additional storage server systems and or application server systems is needed, then the Yes branch is taken to step 66. In step 66, the planning system 12 notifies the administrator on the display 25 that increased capacity in one or more storage server systems 16(1)-16(n), application server systems 17(1)-17(n), database server systems 19(1)-19(n), and/or file server systems 21(1)-21(n) and/or one or more new additional server systems is needed and provides the cost data for increasing capacity and/or new additional server systems along with the cost per user per service, although other types of data and other manners for providing the notification can be used, such email, SMS, or Web notification could be used. Although in these particular embodiments, the planning system 12 provides a notification of the need to increase capacity and/or the need to add additional server systems, in step 66 the planning system 12 can initiate other types and numbers of actions with or without the notification described above. By way of example only, the planning system 12 could signal an automated server provisioning system to automatically increase capacity in existing server systems and/or to add one or more additional server systems.

In step 68, the administrator may increase capacity in one or more storage server systems 16(1)-16(n), application server systems 17(1)-17(n), database server systems 19(1)-19(n), and/or file server systems 21(1)-21(n) and/or add one or more new additional storage server systems and or application server systems, although other numbers and types of components and systems could be added in other manners. For example, the planning system 12 may automatically enable and add one or more additional servers that, for example, may be offline, to the storage server systems 16(1)-16(n) based on the determination in step 62 by the planning system 12. Once one or more additional server systems are added, then the planning system 12 goes to step 64.

In step 64, if increased capacity to one or more storage server systems 16(1)-16(n), application server systems 17(1)-17(n), database server systems 19(1)-19(n), and/or file server systems 21(1)-21(n) and/or one or more new additional storage server systems and or application server systems have/has been added, then the Yes branch is taken back to step 50 where the configuration data, cost data, advanced notification time periods, available services, and lifespan data for the storage server systems 16(1)-16(n), application server systems 17(1)-17(n), database server systems 19(1)-19(n), and/or file server systems 21(1)-21(n) with the increased capacity and/or for each additional server systems is/are entered by the administrator and received by the planning system 12, although other manners for the planning system 12 to obtain this data can be used, such as with an application program user interface or an import utility which is configured to automatically download and input this data into the planning system 12. Once this data has been entered, then existing and/or new user loads are distributed between the existing and new server systems to equalize the overall load on each.

Accordingly, as described herein the present invention provides an effective and automated system and method for predicting and providing advance notification when additional capacity will be required to an administrator. Additionally, the present invention is able to take account variances in hardware configuration in the servers when predicting that increased capacity will be required. Further, the present invention provides the cost data, such as the cost for adding capacity, the cost for adding a new server system and the cost per user per service, which can be used for capacity management and planning.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for capacity management and predictive planning, the method comprising:
   monitoring with a capacity management and predictive planning computing device one or more factors related to a capacity of at least one of one or more server systems, a number of users, and which of one or more services are used on each of the at least one of the one or more server systems;
   obtaining with the planning computing device at least one type of financial cost data related to at least one of the server systems;
   trending with the planning computing device a rate of change of the one or more monitored factors;
   determining with the planning computing device when at least one of an increase in the capacity in at least one of the servers systems and an addition of one or more additional server systems is needed based on the monitoring and the trending;
   determining with the planning computing device an upgrade financial cost for at least one of the adding capacity to the at least one of the servers systems and the adding one or more additional server systems and an average financial cost per user per service on the at least one of the one or more server systems based on the obtained financial cost data and the monitored number of users services used; and
   providing within a set advance notification time period with the planning computing device the determined upgrade financial cost and the average financial cost per user per service on the at least one of the one or more server systems and at least one of a notification of at least one of the need to increase capacity and the need to add one or more additional server systems and an initiation of an automated provisioning of at least one of an increase in the capacity in at least one of the server systems and the addition of one or more additional server systems when the determining determines the at least one of increasing capacity in at least one of the servers systems and adding one or more additional server systems is needed.

2. The method as set forth in claim 1 wherein one of the one or more factors comprises a size of one or more user loads in the overall load on at least one of one or more server systems.

3. The method as set forth in claim 2 wherein the one or more factors further comprise at least one of processor utilization with respect to one or more user loads in the overall load on at least one of one or more server systems, disk space utilization in the overall load on at least one of one or more server systems, RAM utilization in the overall load on at least one of one or more server systems, I/O load in the overall load on at least one of one or more server systems, port utilization in the overall load on at least one of one or more server systems, and network load on the server systems.

4. The method as set forth in claim 3 wherein the determining is based on the trending indicating at least one threshold for the at least one of the one or more monitored factors will be exceeded within a first period of time.

5. The method as set forth in claim 4 further comprising setting the first period of time.

6. The method as set forth in claim 4 wherein the at least one threshold comprises at least one of the processor utilization exceeding a first percentage for greater than a first period of time, the disk space utilization exceeding a second percentage, the RAM utilization exceeding a third percentage for a greater than a second period of time, I/O load exceeding a fourth percentage for greater than a third period of time, port utilization exceeding a fifth percentage for greater than a fourth period of time, and the network load on the server systems exceeding a sixth percentage.

7. The method as set forth in claim 2 wherein another one of the one or more factors comprises at least one type of usage in the at least one of the one or more server systems.

8. The method as set forth in claim 7 wherein the at least one type of usage comprises at least one of sustained usage and peak usage.

9. The method as set forth in claim 7 wherein another one of the one or more factors comprises configuration data for the at least one of the one or more server systems, wherein the determining is further based on the configuration data for the at least one of the one or more server systems.

10. The method as set forth in claim 9 further comprising receiving the configuration data by automatically downloading the configuration data with at least one of an application program interface and an import utility.

11. A non-transitory computer readable medium having stored thereon instructions for capacity management and predictive planning comprising machine executable code which when executed by at least one processor, causes the processor to perform steps comprising:
   monitoring one or more factors related to a capacity of at least one of one or more server systems, a number of users, and which of one or more services are used on each of the at least one of the one or more server systems;
   obtaining at least one type of financial cost data related to at least one of the server systems;
   trending a rate of change of the one or more monitored factors;
   determining when to at least one of an increase in capacity in at least one of the servers systems and an addition of one or more additional server systems is needed based on the monitoring and the trending;
   determining an upgrade financial cost for at least one of the adding capacity to the at least one of the servers systems and the adding one or more additional server systems and an average financial cost per user per service on the at least one of the one or more server systems based on the obtained financial cost data and the monitored number of users services used; and
   providing within a set advance notification time period the determined upgrade financial cost and the average financial cost per user per service on the at least one of the one or more server systems and at least one of a notification of at least one of the need to increase capacity and the need to add one or more additional server systems and an initiation of an automated provisioning of at least one of an increase in capacity in at least one of the server systems and the addition of one or more additional server systems when the determining determines the at least one of increasing capacity in at least one of the servers systems and adding one or more additional server systems is needed.

12. The non-transitory computer readable medium as set forth in claim 11 wherein one of the one or more factors comprises a size of one or more user loads in the overall load on at least one of one or more server systems.

13. The non-transitory computer readable medium as set forth in claim 12 wherein the one or more factors further comprise at least one of processor utilization with respect to one or more user loads in the overall load on at least one of one or more server systems, disk space utilization in the overall load on at least one of one or more server systems, RAM utilization in the overall load on at least one of one or more server systems, I/O load in the overall load on at least one of one or more server systems, and network load on the server systems.

14. The non-transitory computer readable medium as set forth in claim 13 wherein the determining is based on the trending indicating at least one threshold for the at least one of the one or more monitored factors will be exceeded within a first period of time.

15. The non-transitory computer readable medium as set forth in claim 14 further comprising setting the first period of time.

16. The non-transitory computer readable medium as set forth in claim 14 wherein the at least one threshold comprises at least one of the processor utilization exceeding a first percentage for greater than a first period of time, the disk space utilization exceeding a second percentage, the RAM utilization exceeding a third percentage for a greater than a second period of time, I/O load exceeding a fourth percentage for greater than a third period of time, port utilization exceeding a fifth percentage for greater than a fourth period of time, and the network load on the server systems exceeding a sixth percentage.

17. The non-transitory computer readable medium as set forth in claim 12 wherein another one of the one or more factors comprises at least one type of usage in the at least one the one or more server systems.

18. The non-transitory computer readable medium as set forth in claim 17 wherein the at least one type of usage comprises at least one of sustained usage and peak usage.

19. The non-transitory computer readable medium as set forth in claim 17 wherein another one of the one or more factors comprises configuration data for the at least one of the one or more server systems, wherein the determining is further based on the configuration data for the at least one of the one or more server systems.

20. The non-transitory computer readable medium as set forth in claim 19 further comprising receiving the configuration data by automatically downloading the configuration data with at least one of an application program interface and an import utility.

21. A capacity management and predictive planning computing device comprising:
one or more processors;
a memory coupled to the one or more processors which are configured to execute programmed instructions stored in the memory comprising:
monitoring one or more factors related to a capacity of at least one of one or more server systems, a number of users, and which of one or more services are used on each of the at least one of the one or more server systems;
obtaining at least one type of financial cost data related to at least one of the server systems;
trending a rate of change of the one or more monitored factors;
determining when to at least one of an increase in capacity in at least one of the servers systems and an addition of one or more additional server systems is needed based on the monitoring and the trending;
determining an upgrade financial cost for at least one of the adding capacity to the at least one of the servers systems and the adding one or more additional server systems and an average financial cost per user per service on the at least one of the one or more server systems based on the obtained financial cost data and the monitored number of users services used; and
providing within a set advance notification time period the determined upgrade financial cost and the average financial cost per user per service on the at least one of the one or more server systems and at least one of a notification of at least one of the need to increase capacity and the need to add one or more additional server systems and an initiation of an automated provisioning of at least one of an increase in capacity in at least one of the server systems and the addition of one or more additional server systems when the determining determines the at least one of increasing capacity in at least one of the servers systems and adding one or more additional server systems is needed.

22. The device as set forth in claim 21 wherein one of the one or more factors comprises a size of one or more user loads in the overall load on at least one of one or more server systems.

23. The device as set forth in claim 22 wherein the one or more factors further comprise at least one of processor utilization with respect to one or more user loads in the overall load on at least one of one or more server systems, disk space utilization in the overall load on at least one of one or more server systems, RAM utilization in the overall load on at least one of one or more server systems, I/O load in the overall load on at least one of one or more server systems, and network load on the server systems.

24. The device as set forth in claim 23 wherein the one or more processors is further configured to execute programmed instructions stored in the memory for the determining further comprises determining based on the trending indicating at least one threshold for the at least one of the one or more monitored factors will be exceeded within a first period of time.

25. The device as set forth in claim 24 wherein the one or more processors is further configured to execute programmed instructions stored in the memory further comprising setting the first period of time.

26. The device as set forth in claim 24 wherein the at least one threshold comprises at least one of the processor utilization exceeding a first percentage for greater than a first period of time, the disk space utilization exceeding a second percentage, the RAM utilization exceeding a third percentage for a greater than a second period of time, I/O load exceeding a fourth percentage for greater than a third period of time, port utilization exceeding a fifth percentage for greater than a fourth period of time, and the network load on the server systems exceeding a sixth percentage.

27. The device as set forth in claim 22 wherein another one of the one or more factors comprises at least one type of usage in the at least one the one or more server systems.

28. The device as set forth in claim 27 wherein the at least one type of usage comprises at least one of sustained usage and peak usage.

29. The device as set forth in claim 27 wherein another one of the one or more factors comprises configuration data for the at least one of the one or more server systems, wherein the determining is further based on the configuration data for the at least one of the one or more server systems.

30. The device as set forth in claim 29 wherein the one or more processors is further configured to execute programmed instructions stored in the memory further comprising receiving the configuration data by automatically downloading the configuration data with at least one of an application program interface and an import utility.

* * * * *